Patented Aug. 10, 1954

2,686,200

UNITED STATES PATENT OFFICE 2,686,200

ESTER DIALDEHYDES AND ACETALS THEREOF

Joseph C. Lo Cicero and Charles L. Levesque, Philadelphia, Pa., assignors to Rohm & Haas Company, Philadelphia, Pa., a corporation of Delaware No Drawing. Application May 10, 1951, Serial No. 225,684

23 Claims. (Cl. 260—475)

This invention relates to dialdehydes which contain at least two carboxylic ester linkages between two aldehydo groups and to the acetals thereof. This invention deals also with a process for preparing these dialdehydes and their acetals.

It is known that monoaldehydes can be formed from olefinically unsaturated compounds by reacting such compounds with carbon monoxide and hydrogen in the presence of a cobalt catalyst. Diolefins have also been subjected to this sort of reaction, commonly known as the oxo reaction, but they yield a mixture of products which includes monoaldehydes. In effect a diolefin, such as butadiene, tends to undergo hydroformylation as to one olefinic linkage and to undergo hydrogenation as to the second olefinic linkage. But the action on diolefins is actually not so simple and varies with the diolefin.

One of the effects of cobalt as a catalyst is to render double bonds labile, since cobalt acts as an isomerization catalyst as well as a hydroformylation and hydrogenation catalyst. It is evident that in cases where there are two sets of double bonds which are not originally conjugated, one effect of a cobalt catalyst may be to cause the olefinic linkages to become conjugated. This is followed by 1,4-addition of hydrogen, shift of a bond, and finally hydroformylation. For reasons undoubtedly such as these the usual diolefins are difficult to handle in the oxo reaction. While there are some special cases, such as those of diallyl and dimethallyl in which reactions of diolefins with carbon monoxide and hydrogen become better directed and more definite, it is nevertheless generally true that diolefins tend to give monoaldehydes predominantly. The dialdehydes, which are conceived as possible products from the usual diolefins, are evidently too unstable to permit isolation in any practical yield.

It has now been discovered that dialdehydes can in fact be prepared from compounds having two olefinic linkages when these linkages are separated by a chain which includes ester groups. We have found that dialdehydes and acetals thereof can be prepared which have considerable stability and definite utility by reacting together under the influence of a cobalt catalyst carbon monoxide, hydrogen, and compounds which are characterized by having two terminal aliphatic hydrocarbon groups each of which has an olefinic linkage and which are joined by a chain containing at least two carboxylic ester linkages. Beyond this requirement the exact structure or composition of this intermediate chain is not of primary importance. Dialdehydes and their acetals are thus obtainable from starting materials which are conveniently summarized by the formula

R'—E—A—E—R wherein R' and R represent olefinically unsaturated hydrocarbon groups, preferably of not over 18 carbon atoms, or hydrocarbon chains having olefinic unsaturation and interrupted by an ether linkage, E represents a carboxylic ester linkage, —COO—, and A represents a divalent radical. Such radical normally consists of at least two of the elements carbon, hydrogen, and oxygen.

The radical A may be a residue of a dicarboxylic acid, of a dihydric alcohol or phenol, or of a hydroxycarboxylic acid. It may be, for example, an alkylene group, —$C_nH_{2n}$—, a phenyl substituted alkylene group, —CH($C_6H_5$)$CH_2$—, an arylene group, or a divalent substituent which has a hydrocarbon chain interrupted by one or more ether linkages, as in —($C_nH_{2n}O$)$_xC_nH_{2n}$— where $x$ is a small integer, usually having a value from one to three, and $n$ is also an integer, usually having a value of two to four.

R and R' are the residues of monohydric alcohols or monocarboxylic acids which contain an olefinic linkage. These residues may be alkenyl or aralkenyl. Typical unsaturated alcohol residues for R and R' are vinyl, allyl, α-methallyl, α-ethallyl, α-phenylallyl, crotyl, β-ethallyl, β,β-dimethallyl, cinnamyl, 3-butenyl, 4-pentenyl, undecenyl, oleyl, vinyloxyethyl, allyloxyethyl, allyloxypropyl, crotyloxyethyl, and the like. Typical acids which may supply the unsaturated groups are acrylic, α-methacrylic, α-ethacrylic, α-phenylacrylic, vinylacetic, sorbic, crotonic, β-ethylacrylic, β,β-dimethylacrylic, allylacetic, 2-methyl-2-butenoic, hydrosorbic, angelic, tiglic, undecylenic, myristoleic, oleic, linoleic, cinnamic, etc.

The central group A, as mentioned, may be derived from a dihydric alcohol or dihydric phenol, a dicarboxylic acid, or a hydroxycarboxylic acid. As typical of the dihydric glycols, there are mentioned ethylene, propylene, trimethylene, 1,2-butylene, 1,3-butylene, 1,4-butylene, 2,3-butylene, the various hexylene, octylene, or decamethylene glycols and the like, diethylene glycol, dipropylene glycol, triethylene glycol, tetraethylene glycol, glycols having mixed alkylene groups, etc. Dihydric phenols supply a phenylene group as the central group, as do also aromatic dicarboxylic acids.

Typical dicarboxylic acids include malonic, succinic, methylsuccinic, dimethylsuccinic, glutaric, adipic, pimelic, suberic, azelaic, sebacic, brassilic, and the like saturated acyclic acids, γ-methyl-γ-acetylpimelic acid, phthalic, isophthalic, or terephthalic acids, hexahydrophthalic acid, and dicarboxylic acids containing ether linkages, as in

HOOCOC₂H₄OCOOH,

HOOCCH₂OC₂H₄OCH₂COOH

HOOCOC₂H₄OC₂H₄OCOOH

HOOCCH₂OC₂H₄OC₂H₄OCH₂COOH

HOOCOC₃H₆OCOOH

HOOCCH₂OC₆H₄OCH₂COOH etc. The group A may also be derived from a hydroxy acid, typical of which are 2,2-dimethyl-3-hydroxypropionic, γ-hydroxybutyric, delta-hydroxyvaleric, and larger hydroxy aliphatic carboxylic acids, salicyclic acid, and ether containing acids such as

HOC₂H₄OCOOH

HOC₂H₄OCH₂COOH

HOC₂H₄OC₂H₄OCH₂COOH or

HOC₆H₄OCH₂COOH etc. When the group A is a hydrocarbon group, it is preferred that it contain not over ten carbon atoms.

As typical starting materials to yield dialdehydes and the acetals thereof there may be mentioned such compounds as ethylene diacrylate, ethylene dimethacrylate, ethylene dicrotonate, ethylene di-β-ethylacrylate, ethylene diundecylenate, ethylene dioleate, diallyl carbonate, diallyl succinate, diallyl adipate, diallyl sebacate, diallyl phthalate, diallyloxyethyl phthalate, allyl allyloxybutyrate, or the diallyl ester of ether acids shown above. In place of the esters from ethylene glycol used above for purposes of illustration or of the allyl esters specifically named above, the esters may, of course, be derived from other dihydric alcohols or dihydric phenols, from other unsaturated monohydric alcohols or monobasic carboxylic acids, and from other dibasic acids or hydroxycarboxylic acids in accordance with the disclosures above.

Cobalt and its compounds are the effective hydroformylation catalysts. Highly effective catalysts are those soluble in the reaction mixture and for this purpose there may be used cobalt carbonyl or cobalt salts of fatty acids such as caproic, caprylic, capric, lauric, or stearic, or of such acids as naphthenic, alkoxyacetic, phenylacetic, etc. Active, finely divided cobalt may also serve as a catalyst. The amount of cobalt catalyst required is small, amounts from 0.002 to 0.1 mole per mole of unsaturated diester being generally sufficient. The preferred amounts are from 0.004 to 0.05 mole per mole of diester. After completion of the reaction the cobalt catalyst can be decomposed, removed, or separated during the isolation or purification of the product.

The chosen unsaturated diester is placed in a reaction vessel which is designed to withstand pressure. There is added a cobalt catalyst and, if desired, an inert organic solvent, such as benzene, toluene, or naphtha. The vessel is then pressured with a mixture of carbon monoxide and hydrogen in a molar ratio from 2:1 to 1:2 and the vessel is heated at a temperature from 80° to 300° C. under pressures from 100 pounds per square inch upwards, pressures of 3000 to 5000 pounds being generally most useful. Higher pressures may be used if desired such as, for example, up to 15,000 pounds, the upper limit being determined only by apparatus limitations. As gas is consumed, additional gas may be admitted to the reaction vessel. When about the theoretical amount of gas has been used, the reaction is interrupted by cooling the reaction vessel and venting it. The product at this point is the desired dialdehyde and can be isolated as a residue after charcoaling or filtering, and stripping off of solvent.

To the reaction mixture, if acetals are the products desired, there are added an alcohol and an acetal-forming catalyst. A trace of a strong acid, a small amount of calcium chloride, zinc chloride, ferric chloride, or the like, or the addition of a little boron trifluoride is used to provide a catalyst. The mixture is then left standing for several hours or more with occasional stirring. The organic material and acetal-forming catalyst are then separated or the catalyst is destroyed. The product is present in the reaction mixture. The volatile components thereof are stripped off and the product is obtained as a residue. If desired, the product can be purified by such steps as charcoaling, extracting, or the like. In some cases the product can be purified by distillation at low pressures.

The preferred alcohols for forming acetals are methyl and ethyl alcohols, but other alcohols may be used, including propyl, butyl, octyl, nonyl, allyl, benzyl, cyclohexyl, and other monohydric alcohols, ethylene glycol, trimethylene glycol, and the like as typical polyhydric alcohols. It is usually helpful to use the alcohol in good excess over theory. Unreacted alcohol can be stripped off at the end of the reaction. Alcohols of not over nine carbon atoms are preferred.

In an alternative method unsaturated diester, cobalt catalyst, and a saturated monohydric alcohol, particularly methyl or ethyl alcohol, together with an inert solvent, if desired, are treated with carbon monoxide and hydrogen under pressure at elevated temperature, reaction conditions being essentially as defined above. The acetals are obtained directly. Catalyst can be decomposed by refluxing the alcohol-containing mixture, heating with hydrogen or carbon dioxide, washing with an acid solution, or similar step. The reaction products may be purified by extraction methods, stripping, treatment with charcoal to remove color, and in some cases by distillation in a short path still.

The dialdehydes and their acetals react with cellulosic materials. They are useful in this connection to promote stabilization of woven fabrics, resistance to water, crushproofness, and the like. They likewise react with proteinaceous materials to render the latter insoluble and stable. They act as softeners, modifiers, and plasticizers for resinous materials and resinous compositions. They are also useful as chemical intermediates.

The following illustrative examples supply additional details concerning the preparation of dialdehydes and their acetals. Parts are by weight.

*Example 1*

A mixture of 77 parts of diallyl phthalate, 48 parts of benzene, and 12 parts of a 10% solution of cobalt carbonyl in benzene was treated at 3000 p. s. i. with 1:1 synthesis gas and heated with agitation. At about 100° C. it was noted that gas was being taken up. The temperature was maintained at 115°–120° C. Additional gas was supplied to hold the pressure between 3000 and 4000 p. s. i. After about three hours four moles of gas per mole of diallyl phthalate had been taken up and the reaction was discontinued. The reaction vessel was cooled and the gas was vented. At this point some of the crude product was taken and was titrated with hydroxylamine hydrochloride. It was found that the conversion to dialdehyde was 98%.

An aliquot part of the reaction mixture was heated up to 115° C. with carbon dioxide under pressure to decompose the catalyst remaining therein. The mixture was cooled, vented, and filtered. Benzene was removed under reduced pressure to give the product. This corresponded in composition to

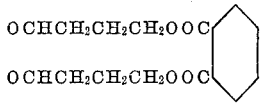

OCHCH₂CH₂CH₂OOC
OCHCH₂CH₂CH₂OOC

In place of an allyl ester as used above there may be used other diesters in which in place of allylically unsaturated terminal groups there are used other unsaturated aliphatic groups, preferably such groups having up to eight carbon atoms. In each case the terminal groups are saturated and formyl groups are added. The resulting dialdehydes are formed in good conversion and can be collected in this form. It is, however, more desirable to convert the dialdehydes to their acetals.

This was done with the remaining portion of the crude product. To this there were added 50 parts of anhydrous methanol and 25 parts of anhydrous calcium chloride. The resulting mixture was left for 48 hours at room temperature with occasional agitation. The organic liquid was decanted from the salt, which was twice extracted with 40 part portions of benzene. The extracts were added to the decanted liquid. The batch was then warmed to 50°–60° C. and evaporated under reduced pressure to yield a residue which was heated to 70° C./15 mm. for 30 minutes. An aldehyde assay of this product showed that it contained 15% aldehyde group (theory 15.35%). It was identified as the tetramethyl acetal of the dialdehyde, di-ω-formylpropyl phthalate, having the formula (CH₃O)₂CHCH₂CH₂CH₂OOCC₆H₄
COOCH₂CH₂CH₂CH(OCH₃)₂

Repetition of the above procedure with substitution of cobalt naphthenate or oleate for cobalt carbonyl leads to the same products. The naphthenate or oleate portion from the catalyst is removed during the purification of the product by washing with a mild alkaline solution.

*Example 2*

A mixture of 61.5 parts of diallyl hexahydrophthalate, 50 parts of benzene, and 10 parts of a 12% solution of cobalt carbonyl in benzene was heated at 110°–125° C. under pressure of 3000 to 4000 pounds per square inch with an equimolar mixture of hydrogen and carbon monoxide. When about four moles of gas per mole of starting ester had been taken up, the reaction vessel was cooled and vented. Titration for aldehyde group indicated practically complete conversion to the dialdehyde. The solution of product was heated with charcoal, filtered, and evaporated under low pressure to give the dialdehyde, bis-(formylpropyl) hexahydrophthalate.

*Example 3*

A mixture of 78.7 parts of diallyl succinate, 30 parts of benzene, and 15 parts of a 10% cobalt carbonyl solution in benzene was placed in an autoclave and an equimolar mixture of carbon monoxide and hydrogen pressured in at 3000 pounds per square inch. The reaction mixture was heated to 125° C. and additional gas mixture was added to maintain the pressure. When the theoretical amount of gas had been added, the autoclave was cooled and vented. The crude product was the compound

OCHCH₂CH₂CH₂OCOCH₂
CH₂COOCH₂CH₂CH₂CHO

It was mixed with 50 parts of anhydrous methanol and 50 parts of calcium chloride and the resulting mixture was stirred from time to time for 16 hours. This mixture was filtered and the liquid stripped of volatile materials under reduced pressure with warming to 65° C. There was obtained a residue of 97.5 parts. This was distilled at 0.02–0.05 mm. in a short path still at 150°–155° C. The distillate amounted to 73 parts. It contained by analysis 54.8% of carbon and 7.94% of hydrogen. It had a specific gravity at 20° C. of 1.115, a refractive index, $n_D^{20}$, of 1.4502 and a molecular refraction of 85.24. This product has the composition.

[(CH₃O)₂CHCH₂CH₂CH₂OCOCH₂—]₂

The theoretical molecular refraction of this compound is 85.96 and its theoretical carbon and hydrogen contents are 54.8% and 8.57%, respectively. The aldehyde assays ranged from 15.8% to 16.5% (16.5% is theory).

*Example 4*

A mixture of 75 parts of diallyl sebacate, 40 parts of benzene, and 15 parts of a 10% cobalt carbonyl solution in benzene was reacted with synthesis gas at 100°–130° C. at 3000–4000 p. s. i. until the theoretical amount of gas had been consumed. The vessel was cooled and vented. The reaction product, a dialdehyde, was mixed with 60 parts of anhydrous methanol and 50 parts of calcium chloride and left standing for about 20 hours. The liquid and salt were separated and the liquid concentrated by evaporation of solvent at 50°–60° C. under reduced pressure. The residue was stripped by heating to 80° C./1 mm. There was obtained a dark oil in a yield of 67.5 parts. It had a density of 1.050 at 25° C. and a refractive index, $n_D^{25}$, of 1.4532. It corresponded in composition to

[(CH₃O)₂CHCH₂CH₂CH₂OCOC₄H₈—]₂

*Example 5*

A mixture of 78.5 parts of ethylene dicrotonate, 40 parts of benzene, and 12 parts of a 10% cobalt carbonyl solution in benzene was subjected to hydroformylation as in the previous examples, temperatures of 120°–130° C. and pressures of 2000 to 3500 p. s. i. being used. The reaction mixture was treated with 60 parts of anhydrous methanol and 30 parts of calcium chloride for a period of 40 hours. The organic liquid was separated and stripped of solvent by being warmed up to 80° C. under reduced pressure, the pressure being finally reduced to 0.5 mm. There was obtained a dark residue in an amount of 80 parts.

This gave an aldehyde assay of 16% and corresponded in composition to

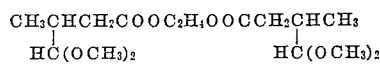

A portion of the product was distilled in a short path still at 179°–185° C./0.02 mm. The distillate had a refractive index, $n_D^{25}$, of 1.4614 and a specific gravity at 25° C. of 1.144. It gave an aldehyde assay of 16.7% (theory 16.5%).

Example 6

There were mixed 73 parts of the dicrotonate of diethylene glygol, 40 parts of benzene, and 15 parts of a 10% cobalt carbonyl solution in benzene. This mixture was reacted with a mixture of carbon monoxide and hydrogen in approximately a 1:1 molar ratio at temperatures up to 140° C. and pressures of 3000–4000 p. s. i. When the theoretical consumption of gas was approached, the reaction vessel was cooled and vented. The reaction product was mixed with 150 parts of methanol and two parts of p-toluenesulfonic acid. The reaction mixture was left standing for two days. It was then treated with two parts of potassium carbonate and stirred for two hours. Benzene was taken off at 60°–70° C. with pressure being reduced to 20 mm. The residue was filtered and stripped at 65° C. and 0.25 mm. The product thus obtained was a dark oil which gave an aldehyde assay of 12.1% (theory 12.0% for the tetramethyl acetal) and which amounted to 93 parts by weight. This compound has the structure

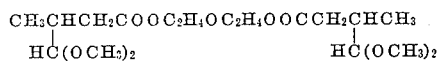

Example 7

There were mixed 61 parts of the dioleate of ethylene glycol, 40 parts of benzene, and 10 parts of a 10% cobalt carbonyl solution in benzene. This mixture was subjected to reaction with synthesis gas at 140°–150° C. at about 3000 p. s. i. After about four hours approximately the theoretical amount of gas had been consumed. The reaction vessel was allowed to cool and was vented. The product was mixed with 100 parts of methanol and 25 parts of calcium chloride. The resulting mixture was stirred from time to time for 48 hours and then separated. The salt was extracted with benzene and the extract was added to the main lot of liquid. Solvent was evaporated therefrom under reduced pressure and the residue was stripped of volatile material at 80° C./1 mm. The product was chiefly the tetramethyl acetal of ethylene diformylstearates.

When ethylene di(ω-undecylenate) is used in place of ethylene dioleate, and the above procedure is followed, there are obtained dialdehydes corresponding in composition to

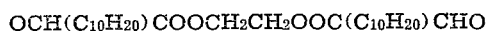

and the acetals thereof, the formyl groups entering at either side of the olefinic bonds as usually occurs in reactions of this type, yet with the omega isomer predominating.

Example 8

There were mixed 75 parts of the ester of one mole of ethylene glycol and two moles of 2-ethyl-2-hexenoic acid, this acid being prepared according to the directions of Lichtenburger and Naftaki, Bull. Soc. Chim. (5) 4, pages 325–333 (1937), 40 parts of benzene, and 17 parts of a 12% cobalt carbonyl solution in benzene. This mixture was reacted with a mixture of hydrogen and carbon monoxide gas at 4000 p. s. i. and temperatures of 100°–130° C. for four hours. The reaction mixture was cooled and vented. It was found by titration to be chiefly the dialdehydic product

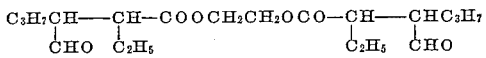

Part of this was treated with calcium chloride and methanol as in previous examples and stripped to yield the tetramethyl acetal of the above dialdehyde. Titrations with hydroxylamine hydrochloride showed the presence of aldehyde groups to the extent of 12.5%. The theoretical value is 12.5%.

Another portion of the above aldehyde was diluted with absolute ethanol and treated with a boron trifluoride-ethanol catalyst. This reaction mixture was left standing for about 70 hours, then washed with a dilute sodium bicarbonate solution, and dried over sodium sulfate. The product was the tetraethyl acetal of the above dialdehyde.

The above reaction of ethylene di(2-ethyl-2-hexenoate) with carbon monoxide and hydrogen was carried out with substitution of five parts of Raney cobalt for the cobalt carbonyl. After the theoretical amount of gas had been taken up, the reaction vessel was cooled and vented. The benzene solution of the product, ethylene bis(2 - ethyl - 3 - formylhexoate), was filtered. There was added 100 parts of isobutyl alcohol. The mixture was treated with 30 parts of calcium chloride, left standing for 63 hours, heated to about 70° C. under reduced pressure, and cooled. The liquid was decanted from the solid, which was extracted with benzene, and the clear solution was evaporated under reduced pressure to give a residue composed chiefly of the tetraisobutyl acetal of the above dialdehyde.

The acetals from monohydric lower aliphatic alcohols; i. e., those of one to four carbon atoms, form a sub-group of particular interest.

Example 9

A mixture of 75 parts of diallyl adipate, 40 parts of benzene, and 20 parts of a 12% cobalt carbonyl solution in benzene was heated up to 125° C. while an equimolar mixture of hydrogen and carbon monoxide was supplied at about 3000 p. s. i. When about the theoretical amount of gas had been taken up, the reaction vessel was cooled and vented. The product was the dialdehyde $OHC(CH_2)_3OCO(CH_2)_4COO(CH_2)_3CHO$ in benzene solution.

This was treated with 60 parts of methanol and 50 parts of calcium chloride and left standing for 24 hours. The organic liquid was decanted from the calcium chloride. The solvent was evaporated to leave as a residue a product corresponding in compostion to

Titration with hydroxylamine hydrochloride shows an aldehyde content of 15% (theory 15.3%).

Example 10

There was prepared bis(2-ethyl-2-hexenyl)-succinate, using 2-ethyl-2-hexenyl alcohol prepared according to German Patent 639,624. A mixture of 75 parts of this ester, 40 parts of benzene, and 15 parts of a 12% cobalt carbonyl solution in benzene was heated with synthesis gas at 4000 p. s. i. at temperatures from 100°–130° C. until the theoretical amount of gas was absorbed. Part of the resulting solution was treated with methyl alcohol in excess and calcium chloride. The mixture was set aside for 48 hours with occasional stirring. Solution and salt were separated. Benzene and alcohol were evaporated and the residue stripped by heating on a steam bath under reduced pressure. The resulting product assays 11.5% aldehyde group and corresponds in composition to

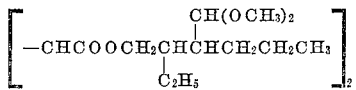

Example 11

There were mixed 75 parts of the ester diethylene glycol bis(allyl carbonate), prepared according to U. S. Patent 2,370,565, 50 parts of benzene, and 18 parts of a 10% cobalt carbonyl solution in benzene. This mixture was reacted with a hydrogen-carbon monoxide mixture at 4000 p. s. i. at 125° C. A dialdehyde resulted as shown by aldehyde titration. This was converted to the acetal as in previous examples. After the solvent was evaporated, there was obtained a product which assays about 14% aldehyde group and has the structure

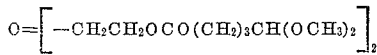

Example 12

There were mixed 75 parts of bis(allyl lactate) carbonate, prepared according to U. S. Patent 2,370,566, 50 parts of benzene, and 18 parts of 12% cobalt carbonyl solution in benzene. This mixture was reacted with a hydrogen-carbon monoxide mixture as in the previous example to form a dialdehyde in benzene solution. This was converted as in the above example to the acetal, which has the structure

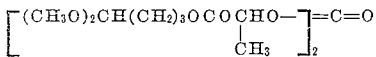

Example 13

There were mixed 75 parts of an ester from two moles of allyl salicylate reacted with one mole of ethylene bis(chloroformate) according to U. S. Patent 2,384,126, 50 parts of benzene, and 18 parts of a 12% cobalt carbonyl solution in benzene. This mixture was reacted with hydrogen and carbon monoxide as in the previous example. The resulting product was a dialdehyde in benzene solution. This was reacted with methanol as above to yield the acetal, which was isolated as a residue. It assays 9.3% aldehyde group and has the structure

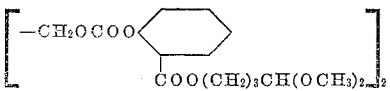

Another variation in dialdehydes and the acetals thereof is obtained by hydroformylating the compound

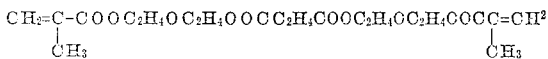

which is prepared from the monomethacrylate of diethylene glycol and succinyl chloride. Other halides of dibasic carboxylic acids can be used in place of succinyl chloride to give the same type of polyester with two unsaturated terminal groups. Hydroformylation leads to homologous or analogous dialdehydes and their acetals.

Yet another starting material is the reaction product of allyl chloroformate and allyl lactate,

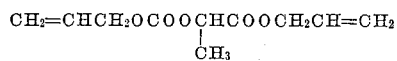

This likewise adds carbon monoxide and hydrogen at each end of the molecule to give the terminal group OCHCH$_2$CH$_2$CH$_2$— which is readily converted to acetals by reaction with an alcohol.

Example 14

A mixture of 75 parts of diallyl succinate, 62 parts of methanol, and 15 parts of a 10% cobalt carbonyl solution in benzene was placed in an autoclave and an equimolar mixture of carbon monoxide and hydrogen was added thereto under a pressure of 3000 p. s. i. The reaction mixture was slowly heated to 125° C. There occurred a reaction which evolved a good deal of heat. Additional gas mixture was passed into the reaction vessel until the theoretical amount had been consumed. The autoclave was cooled and vented. The reaction mixture was stripped under reduced pressure and the residue placed in a short path still, in which it was distilled at pressures below 0.05 mm. at temperatures between 150° and 155° C. The resulting product had a refractive index, $n_D^{20}$, of 1.4497 and a specific gravity at 20° C. of 1.114. It was the acetal (CH$_3$O)$_2$CHCH$_2$CH$_2$CH$_2$OCOCH$_2$
CH$_2$COOCH$_2$CH$_2$CH$_2$CH(OCH$_3$)$_2$

Example 15

A mixture of 75 parts of diallyl succinate, 35 parts of benzene, and 15 parts of a 12% cobalt carbonyl solution in benzene was reacted with carbon monoxide and hydrogen as in Example 3. When the theoretical amount of gas had been consumed, the reaction mixture was discharged from the pressure vessel and treated with 60 parts of ethylene glycol and 50 parts of calcium chloride. The resulting mixture was stored at room temperature for two days with occasional agitation. The mixture was extracted with benzene. The solution was treated with petroleum ether. Two layers formed. The upper layer was taken and the petroleum ether evaporated therefrom to yield a pale yellow liquid residue. The material corresponded in composition to the bisdioxalane.

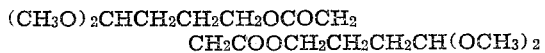

By titration it contained 16.6% of aldehyde groups (theory 16.65%). It had a refractive index, $n_D^{25}$, of 1.4654, and a specific gravity, $$d_{25}^{25}$$

of 1.201. The molar refraction calculated from the refractive index and density is 80.0. The molar refraction calculated from atomic refractions is 81.6.

Example 16

There were mixed 75 parts of diallyl succinate, 155 parts of isobutyl alcohol, and 18 parts of a 12% cobalt carbonyl solution in benzene. This mixture was reacted with a carbon monoxide-hydrogen mixture under pressures of 3000 to 4000 p. s. i. at 120°–130° C. The autoclave was cooled and vented. The reaction mixture was filtered and stripped by being heated under reduced pressure. The material thus obtained was treated with petroleum ether. Two layers formed. The upper layer was taken and evaporated to yield a yellow oil as a residue. It consisted chiefly of the compound

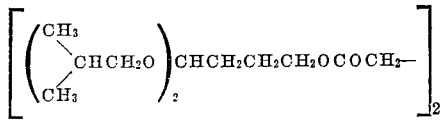

The residue contained by titration 8.2% of aldehyde groups (theory 11.2%). It had a refractive index, $n_D^{25}$, of 1.4496 and a density of 1.017 at 25° C.

The compounds which result from the process of this invention are dialdehydes, to which may be assigned the formula

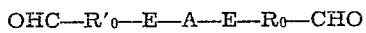

and the acetals thereof, particularly those formed with saturated, lower aliphatic alcohols. Acetals have the formula

wherein R'' is the residue of an alcohol, R'₀ and R₀ are saturated divalent aliphatic hydrocarbon or ether-containing radicals, and E and A have the meanings previously given. The grouping added to the starting materials may be represented as XCH— where X is O= or (R'O)₂=.

We claim:

1. A process for preparing dialdehydes having at least two carboxylic ester linkages in the portion of the molecule separating the aldehydo groups which comprises reacting at a pressure above 100 pounds per square inch, at a temperature between 80° and 300° C., and in the presence of a cobalt catalyst from the class consisting of active cobalt metal, cobalt carbonyl, and organic solvent-soluble salts of cobalt carbon monoxide, hydrogen, and a compound having two terminal aliphatic hydrocarbon groups each of which has an olefinic linkage and contains not over 18 carbon atoms and intermediate said groups a chain containing a total of not over 12 carbon atoms, containing at least two carboxylic ester groups, and consisting of the elements carbon, hydrogen, and oxygen.

2. In a process for preparing dialdehydes and deriving acetals therefrom by reaction with an alcohol in the presence of an acidic catalyst, said dialdehydes having at least two carboxylic ester linkages in the group separating the two aldehydo groups thereof, the process step of reacting at a pressure between 100 and 15,000 pounds per square inch, at a temperature between 80° and 300° C., and in the presence of a cobalt catalyst from the class consisting of active cobalt metal, cobalt carbonyl, and organic solvent-soluble salts of cobalt carbon monoxide, hydrogen, and a compound having two terminal aliphatic hydrocarbon groups each of which has an olefinic linkage and contains not over 18 carbon atoms and which are joined by a divalent group containing a total of not over 12 carbon atoms, containing at least two carboxylic ester linkages, and consisting of the elements carbon, hydrogen, and oxygen.

3. A process for preparing dialdehydes having at least two carboxylic ester groups in the portion of the molecule separating the aldehydo groups which comprises reacting at a pressure between 100 and 15,000 pounds per square inch, at a temperature between 80° and 300° C., and in the presence of a cobalt catalyst from the class consisting of active cobalt metal, cobalt carbonyl, and organic solvent-soluble salts of cobalt carbon monoxide, hydrogen, and a compound of the structure

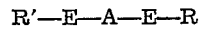

wherein R' and R represent olefinically unsaturated hydrocarbon groups of not over 18 carbon atoms, E represents a carboxylic ester linkage, and A represents a divalent radical from the class consisting of alkylene chains of not over ten carbon atoms, alkylene chains interrupted by ether oxygen, and monophenylene groups.

4. A process for preparing dialdehydes having two aldehydo groups which are separated by a divalent chain containing two carboxylic ester groups which comprises reacting together under pressure at a temperature between 80° and 300° C. in the presence of a cobalt catalyst from the class consisting of active cobalt metal, cobalt carbonyl, and organic solvent-soluble salts of cobalt carbon monoxide, hydrogen, and a compound of the structure

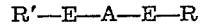

wherein R' and R represent olefinically unsaturated aliphatic hydrocarbon groups of not over 18 carbon atoms, E represents a carboxylic ester linkage, and A represents a divalent hydrocarbon group of not over 10 carbon atoms.

5. A process for preparing dialdehydes having two aldehydo groups which are separated by a divalent chain containing two carboxylic ester groups which comprises reacting together under pressure at a temperature between 80° and 300° C. in the presence of a cobalt catalyst from the class consisting of active cobalt metal, cobalt carbonyl, and organic solvent-soluble salts of cobalt carbon monoxide, hydrogen, and a compound of the structure

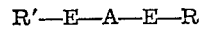

wherein R' and R represent allylically unsaturated aliphatic hydrocarbon groups of not over eight carbon atoms, E represents a carboxylic ester linkage, and A represents a saturated divalent aliphatic hydrocarbon group of not over 10 carbon atoms.

6. A process for preparing dialdehydes which comprises reacting together under pressure at a temperature between 80° and 300° C. in the presence of a cobalt catalyst from the class consisting of active cobalt metal, cobalt carbonyl, and organic solvent-soluble salts of cobalt carbon monoxide, hydrogen, and a compound of the structure

wherein R' and R represent olefinically unsaturated aliphatic hydrocarbon groups of not over eight carbon atoms and A represents an alkylene group of not over ten carbon atoms.

7. A process for preparing a compound of the formula

which comprises reacting together under pressure at a temperature between 80° and 300° C. in the presence of a cobalt catalyst from the class consisting of active cobalt metal, cobalt carbonyl, and organic solvent-soluble salts of cobalt carbon monoxide, hydrogen, and diallyl succinate.

8. A process for preparing a compound of the formula

which comprises reacting together under pressure at a temperature between 80° and 300° C. in the presence of a cobalt catalyst from the class consisting of active cobalt metal, cobalt carbonyl, and organic solvent-soluble salts of cobalt carbon monoxide, hydrogen, and diallyl sebacate.

9. A process for preparing dialdehydes having two aldehydo groups which are separated by a divalent chain containing two carboxylic ester groups which comprises reacting together under pressure at a temperature between 80° and 300° C. in the presence of a cobalt catalyst from the class consisting of active cobalt metal, cobalt carbonyl, and organic solvent-soluble salts of cobalt carbon monoxide, hydrogen, and a compound of the structure $$R'-E-A-E-R$$

wherein R' and R represent allylically unsaturated aliphatic hydrocarbon groups of not over eight carbon atoms, E represents a carboxylic ester linkage, and A represents a monophenylene group.

10. In a process for preparing dialdehydes and deriving acetals therefrom, said dialdehydes having at least two carboxylic ester linkages in the part of the molecule separating the two aldehydo groups thereof, the process steps of reacting at a pressure between 100 and 15,000 pounds per square inch, at a temperature between 80° and 300° C., and in the presence of a cobalt catalyst from the class consisting of active cobalt metal, cobalt carbonyl, and organic solvent-soluble salts of cobalt carbon monoxide, hydrogen, and a compound having two terminal aliphatic hydrocarbon groups each of which has an olefinic linkage and contains not over 18 carbon atoms and which are joined by a divalent group having a total of not over 12 carbon atoms, containing at least two carboxylic ester linkages, and consisting of the elements carbon, hydrogen, and oxygen, whereby a dialdehyde is formed, and reacting said dialdehyde with an alcohol from the class consisting of unsubstituted monohydric alcohols and alkylene glycols of not over nine carbon atoms in the presence of a small amount of an acidic catalyst to form an acetal.

11. In the process steps of claim 10 the improvement which comprises reacting the dialdehyde with a saturated lower aliphatic monohydric alcohol.

12. In the process step of claim 10 the improvement which comprises reacting the dialdehyde with methanol.

13. As new chemical substances, compounds of the formula $$XCHR'_0-E-A-E-R_0CHX$$

wherein E is a carboxylic ester linkage, A is a divalent group containing a total of not over ten carbon atoms and consisting of at least two of the elements carbon, hydrogen, and oxygen, R'$_0$ and R$_0$ are saturated divalent aliphatic hydrocarbon groups which contain not over 18 carbon atoms each, and X is a member of the class consisting of O= and (R''O)$_2$= where R'' is a lower alkyl group.

14. As new chemical substances, compounds of the formula $$OCHR'_0-E-A-E-R_0CHO$$

wherein R'$_0$ and R$_0$ are saturated divalent aliphatic hydrocarbon groups of not over eight carbon atoms, E is a carboxylic ester linkage, and A is a saturated divalent aliphatic hydrocarbon group of not over 10 carbon atoms.

15. As new chemical substances, compounds of the formula $$OCH(CH_2)_3-E-A-E-(CH_2)_3CHO$$

wherein E is a carboxylic ester linkage and A is a saturated divalent aliphatic hydrocarbon group of not over 10 carbon atoms.

16. As a new chemical compound, $$OCH(CH_2)_3OOC(CH_2)_2COO(CH_2)_3CHO$$

17. As a new chemical compound, $$OCH(CH_2)_3OOC(CH_2)_8COO(CH_2)_3CHO$$

18. As new chemical substances, compounds of the formula $$(R''O)_2CH-R'_0-E-A-E-R_0-CH(OR'')_2$$

wherein E is a carboxylic ester linkage, A is a saturated divalent aliphatic hydrocarbon group of not over 10 carbon atoms, R'$_0$ and R$_0$ are saturated divalent aliphatic hydrocarbon groups of not over eight carbon atoms, and R'' is a lower alkyl group.

19. As a new chemical substance, a compound of the formula $$(CH_3O)_2CH(CH_2)_3-E-A-E-(CH_2)_3CH(OCH_3)_2$$

wherein E is a carboxylic ester linkage and A is a saturated divalent aliphatic hydrocarbon group of not over 10 carbon atoms.

20. As a new chemical compound, $$(CH_3O)_2CH(CH_2)_3OOCC_8H_{16}COO(CH_2)_3CH(OCH_3)_2$$

21. As a new chemical compound, $$(CH_3O)_2CH(CH_2)_3OOCC_2H_4COO(CH_2)_3CH(OCH_3)_2$$

22. As new chemical substances, compounds of the formula $$(CH_3O)_2CH(CH_2)_3-E-A-E-(CH_2)_3CH(OCH_3)_2$$

where E is a carboxylic ester linkage and A is a phenylene group.

23. As a new chemical compound, $$(CH_3O)_2CH(CH_2)_3OOCC_6H_4COO(CH_2)_3CH(OCH_3)_2$$

References Cited in the file of this patent

UNITED STATES PATENTS

| Number | Name | Date |
|---|---|---|
| 2,491,915 | Barrick et al. | Dec. 20, 1949 |

FOREIGN PATENTS

| Number | Country | Date |
|---|---|---|
| 614,010 | Great Britain | Dec. 8, 1948 |